US012669567B2

(12) United States Patent
Wu et al.

(10) Patent No.: US 12,669,567 B2
(45) Date of Patent: Jun. 30, 2026

(54) BLUETOOTH POSITIONING METHOD, TERMINAL DEVICE, ELECTRONIC DEVICE AND STORAGE MEDIUM

(71) Applicants: VERISILICON MICROELECTRONICS (SHANGHAI) CO., LTD., Shanghai (CN); VERISILICON MICROELECTRONICS (NANJING) CO., LTD., Jiangsu (CN)

(72) Inventors: Jingjun Wu, Shanghai (CN); Hao Zhang, Shanghai (CN); Zhaonan Jin, Shanghai (CN)

(73) Assignee: VERISILICON MICROELECTRONICS (SHANGHAI) CO., LTD., Shanghai (CN)

( * ) Notice: Subject to any disclaimer, the term of this patent is extended or adjusted under 35 U.S.C. 154(b) by 300 days.

(21) Appl. No.: 18/241,932

(22) Filed: Sep. 4, 2023

(65) Prior Publication Data

US 2024/0201311 A1     Jun. 20, 2024

(30) Foreign Application Priority Data

Dec. 15, 2022     (CN) .......................... 202211620559.5

(51) Int. Cl.
        *G01S 5/00*          (2006.01)
        *G01S 5/02*          (2010.01)
                    (Continued)
(52) U.S. Cl.
        CPC .............. *G01S 5/0244* (2020.05); *G01S 5/10* (2013.01); *H04W 4/80* (2018.02)
(58) Field of Classification Search
        CPC .......... G01S 5/0244; G01S 5/10; H04W 4/80
        See application file for complete search history.

(56) References Cited

U.S. PATENT DOCUMENTS 9,860,096 B1 *   1/2018   Ganwani ................. H04W 4/33
11,346,918 B1 *   5/2022   Ganwani ............. H03G 3/3068
                    (Continued)

FOREIGN PATENT DOCUMENTS

CN        108882360 A      11/2018
CN        112702785 A  *   4/2021   ............ H04W 64/00
                    (Continued)

OTHER PUBLICATIONS

First Office Action of priority document CN 202211620559.5.
English translation of First Office Action of priority document CN 202211620559.5.

*Primary Examiner* — Khai M Nguyen
(74) *Attorney, Agent, or Firm* — Whitestone Law, PLLC

(57)          ABSTRACT

Provided are a Bluetooth positioning method, a terminal device, an electronic device and a storage medium The Bluetooth positioning method includes: acquiring a sampled message, wherein the sampled message includes a sampled IQ data and a data signal strength indicator, and the sampled IQ data includes a plurality of sampled IQ values obtained by sequentially sampling signals received or transmitted by a plurality of antennas in a Bluetooth antenna array according to a preset order, wherein the signals received or transmitted by the plurality of antennas are signals transmitted by an identical signal source; and judging whether the data signal strength indicator is greater than a preset threshold, wherein if the data signal strength indicator is greater than the preset threshold, a position angle of the signals is obtained based on the sampled IQ data in the sampled message.

18 Claims, 3 Drawing Sheets

(51) Int. Cl.
    *G01S 5/10*        (2006.01)
    *H04W 4/80*        (2018.01)

(56)             References Cited

U.S. PATENT DOCUMENTS

| | | | |
|---|---|---|---|
| 11,668,781 B2 * | 6/2023 | Ben-Shachar | G01S 3/72 |
| | | | 342/442 |
| 12,040,557 B1 * | 7/2024 | Sharma | H01Q 3/38 |
| 2017/0026798 A1 * | 1/2017 | Prevatt | H04W 4/023 |
| 2020/0044693 A1 * | 2/2020 | Pei | G01S 5/0009 |
| 2020/0113006 A1 * | 4/2020 | Bloechl | G01S 5/14 |
| 2021/0399775 A1 * | 12/2021 | Lehtimaki | H04B 7/0805 |

FOREIGN PATENT DOCUMENTS

| | | | | |
|---|---|---|---|---|
| CN | 114915897 A | | 8/2022 | |
| CN | 115190425 A | * | 10/2022 | H04W 4/023 |
| JP | 7697343 B2 | * | 6/2025 | G06F 21/31 |

* cited by examiner

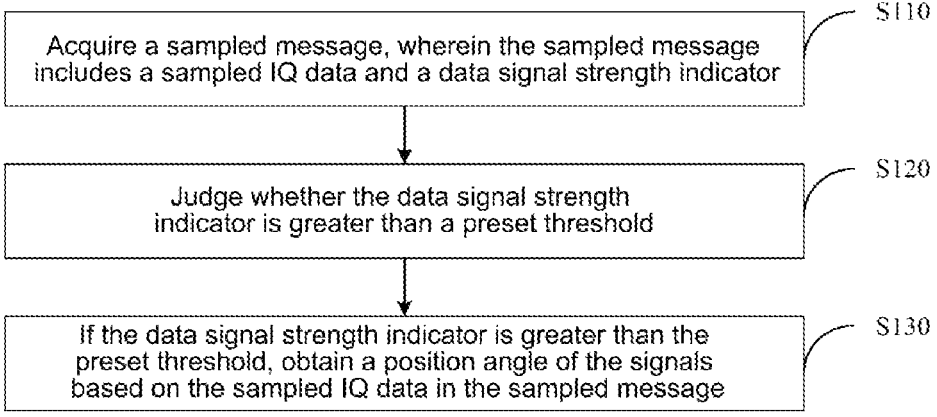

Acquire a sampled message, wherein the sampled message includes a sampled IQ data and a data signal strength indicator    S110

Judge whether the data signal strength indicator is greater than a preset threshold    S120

If the data signal strength indicator is greater than the preset threshold, obtain a position angle of the signals based on the sampled IQ data in the sampled message    S130

FIG. 1

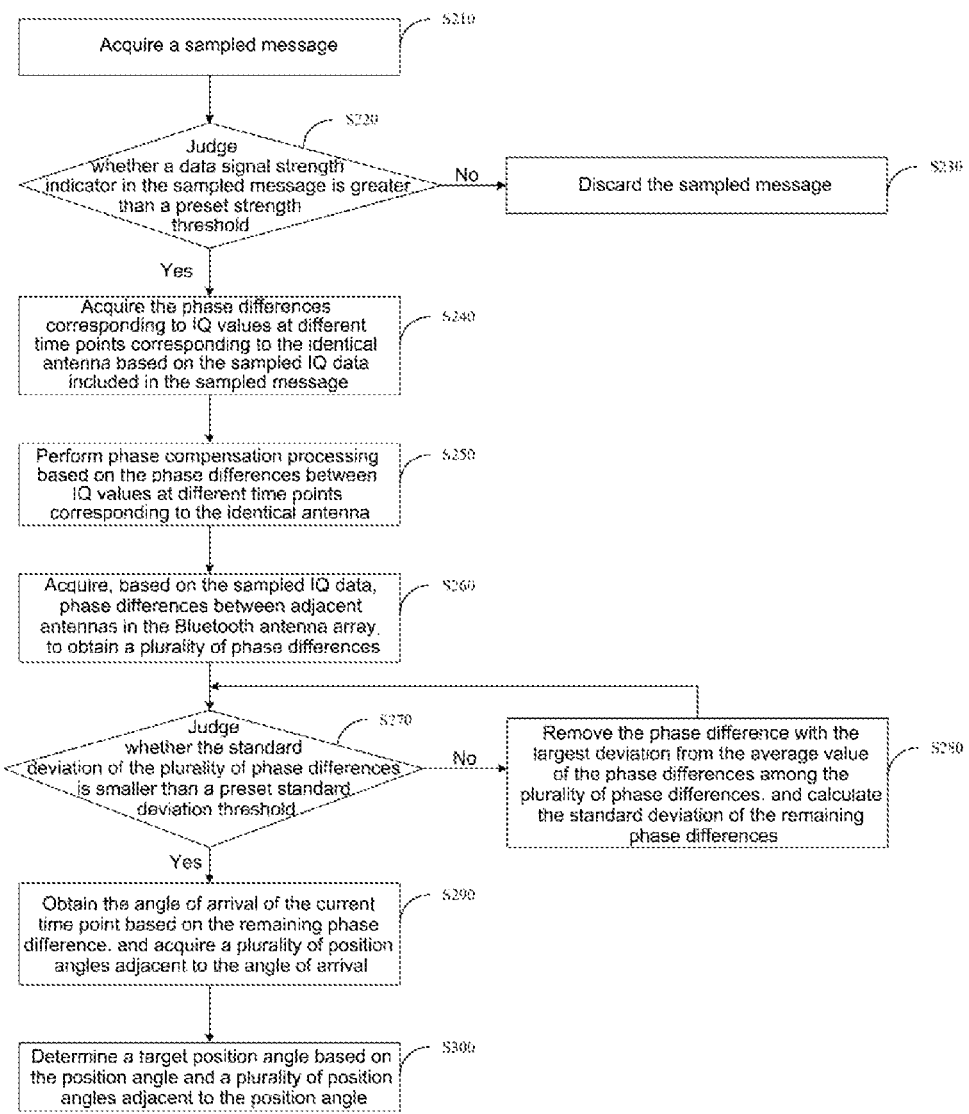

Acquire a sampled message — S210

Judge whether a data signal strength indicator in the sampled message is greater than a preset strength threshold — S220

No → Discard the sampled message — S230

Yes ↓

Acquire the phase differences corresponding to IQ values at different time points corresponding to the identical antenna based on the sampled IQ data included in the sampled message — S240

Perform phase compensation processing based on the phase differences between IQ values at different time points corresponding to the identical antenna — S250

Acquire, based on the sampled IQ data, phase differences between adjacent antennas in the Bluetooth antenna array, to obtain a plurality of phase differences — S260

Judge whether the standard deviation of the plurality of phase differences is smaller than a preset standard deviation threshold — S270

No → Remove the phase difference with the largest deviation from the average value of the phase differences among the plurality of phase differences, and calculate the standard deviation of the remaining phase differences — S280

Yes ↓

Obtain the angle of arrival of the current time point based on the remaining phase difference, and acquire a plurality of position angles adjacent to the angle of arrival — S290

Determine a target position angle based on the position angle and a plurality of position angles adjacent to the position angle — S300

FIG. 2

BLUETOOTH POSITIONING METHOD, TERMINAL DEVICE, ELECTRONIC DEVICE AND STORAGE MEDIUM

CROSS-REFERENCE TO RELATED APPLICATION

The present disclosure claims the priority to Chinese patent application with the filing number 2022116205595 filed on Dec. 15, 2022 with the Chinese Patent Office, the contents of which are incorporated herein by reference in entirety.

TECHNICAL FIELD

The present disclosure relates to the technical field of Bluetooth positioning, in particular to a Bluetooth positioning method, a terminal device, an electronic device and a storage medium.

BACKGROUND ART

In recent years, the needs for Bluetooth positioning system are more and more extensive, and two new and more accurate Bluetooth positioning methods are proposed in the 5.1 protocol of the Bluetooth wireless communication module. One method is AOA (angle of arrival), and the other method is AOD (angle of departure). In both methods, a phase difference is calculated according to the time difference of receiving or the time difference of transmitting between a plurality of antennas in a Bluetooth antenna array, and the phase difference is used to obtain the positioning angle.

When using these ways to obtain the positioning angle, the quality of signals received or transmitted by a plurality of antennas in the Bluetooth antenna array will influence the accuracy of the positioning angle. The worse the signal quality is, the lower the accuracy of the positioning angle is.

SUMMARY

The present disclosure provides a Bluetooth positioning method, a terminal device, an electronic device and a storage medium, so as to solve the problem that the quality of signals received or transmitted by a plurality of antennas in a Bluetooth antenna array will influence the accuracy of positioning angles in the prior art.

In a first aspect, the present disclosure provides a Bluetooth positioning method, which includes: acquiring a sampled message, wherein the sampled message includes a sampled IQ data (where I is in-phase, Q is quadrature, and the phase of Q is 90° different from that of I) and a data signal strength indicator, the sampled IQ data includes a plurality of sampled IQ values obtained by sequentially sampling, according to a preset order, signals received or transmitted by a plurality of antennas in a Bluetooth antenna array, and the signals received or transmitted by the plurality of antennas are signals transmitted by an identical signal source; and judging whether the data signal strength indicator is greater than a preset threshold, wherein if the data signal strength indicator is greater than the preset threshold, a position angle of the signals is obtained based on the sampled IQ data in the sampled message.

In the embodiments of the present disclosure, by excluding signals whose data signal strength indicators are lower than the preset threshold, signals with poor signal quality can be filtered out, so that the quality of signal for calculating the position angle is higher and the accuracy of the finally calculated position angle is ensured.

In combination with the technical solution provided in the first aspect, in some possible implementations, the method includes: acquiring, based on the sampled IQ data, phase differences between adjacent antennas in the Bluetooth antenna array, to obtain a plurality of phase differences; acquiring, based on the sampled IQ data, phase differences corresponding to IQ values at different time points corresponding to an identical antenna; performing, based on the phase differences between the IQ values at different time points corresponding to the identical antenna, a phase compensation processing on the plurality of phase differences; and obtaining, based on the plurality of phase differences after the phase compensation processing, the position angle at a current time point.

In the embodiments of the present disclosure, the phase differences between adjacent antennas are compensated by the phase differences between IQ values at different time points corresponding to the identical antenna, so that the error of IQ values obtained by sampling can be reduced, and the accuracy of the position angle at the current time point can be improved.

In combination with the technical solution provided in the first aspect, in some possible implementations, before the obtaining, based on the plurality of phase differences after the phase compensation processing, the position angle at a current time point, the method further includes: determining that a standard deviation of the plurality of phase differences is smaller than a preset standard deviation threshold.

In the embodiments of the present disclosure, by ensuring that the standard deviation of the plurality of phase differences is smaller than the preset standard deviation threshold, noise in the plurality of phase differences for obtaining the position angle can be prevented, and the accuracy of the finally obtained position angle is ensured.

In combination with the technical solution provided in the first aspect, in some possible implementations, after the obtaining the position angle at a current time point, the method further includes: determining a target position angle based on the position angle and a plurality of position angles adjacent to the position angle.

In the embodiments of the present disclosure, by correcting the position angle through the plurality of position angles adjacent to the position angle, the accuracy of the position angle can be improved, so that the obtained target position angle is more in line with the actual situation.

In combination with the technical solution provided in the first aspect, in some possible implementations, when the signal source and the Bluetooth antenna array are relatively stationary, the determining a target position angle based on the position angle and a plurality of position angles adjacent to the position angle includes: acquiring a first average value of the position angle and a plurality of position angles adjacent to the position angle; and removing, among the position angle and the plurality of position angles adjacent to the position angle, an angle whose difference from the first average value is greater than a preset angle threshold, and calculating a second average value of the remaining angles, wherein the second average value is the target position angle at the current time point.

In the embodiments of the present disclosure, since the signal source and the Bluetooth antenna array are relatively stationary, that is, the angle between them will not change, by removing the angle whose difference from the first average value is greater than the preset angle threshold, and taking the average value of the remaining angles as the target position angle at the current time point, the accuracy of the finally obtained target position angle can be effectively improved.

In combination with the technical solution provided in the first aspect, in some possible implementations, when the signal source and the Bluetooth antenna array are relatively moving, the determining a target position angle based on the position angle and a plurality of position angles adjacent to the position angle includes: performing, based on preset weights, a weighted average processing on the position angle and the plurality of position angles adjacent to the position angle, to obtain the target position angle at the current time point, wherein a weight value of a position angle corresponding to a time point closer to the current time point is greater, and a weight value of a position angle corresponding to a time point farther away from the current time point is smaller.

In the embodiments of the present disclosure, the plurality of position angles adjacent to the position angle can characterize the motion law of the signal source, wherein when the target position angle at the current time point is calculated, the position angles adjacent to the position angle are included, so that the target position angle at the current time point can be corrected according to the motion law of the signal source. At the same time, the time point closer to the current time point has greater current influence. Therefore, the finally obtained target position angle can be more accurate by setting the weight value of the target position angle corresponding to the time point closer to the current time point to be greater.

In combination with the technical solution provided in the first aspect, in some possible implementations, the method further includes: acquiring the number of the sampled messages whose data signal strength indicator is lower than the preset threshold within a preset duration; and adjusting the preset threshold according to the number of the sampled messages whose data signal strength indicator is lower than the preset threshold.

In the embodiments of the present disclosure, the preset threshold is adjusted according to the number of sampled messages whose data signal strength indicator is lower than the preset threshold within the preset duration, so that the setting of the preset threshold is more in line with the actual situation, and the accuracy of the position angle obtained subsequently is improved.

In a second aspect, the present disclosure provides a terminal device, which includes a Bluetooth module and a processor, wherein the Bluetooth chip is configured for sequentially sampling, according to a preset order, signals received or transmitted by a plurality of antennas in the Bluetooth antenna array to obtain a plurality of sampled IQ values, acquiring a data signal strength indicator of the signals received or transmitted by the Bluetooth antenna array, and generating a sampled message based on the plurality of sampled IQ values and the data signal strength indicator; and the processor is configured for: acquiring the sampled message transmitted by the Bluetooth module, and judging whether the data signal strength indicator carried in the sampled message is greater than a preset threshold, wherein if the data signal strength indicator is greater than the preset threshold, a position angle of the signals received or transmitted by the Bluetooth antenna array is obtained based on the sampled IQ data in the sampled message.

In a third aspect, an embodiment of the present disclosure further provides an electronic device, which includes a memory and a processor. The memory is connected to the processor. The memory is configured for storing a program.

The processor is configured for calling the program stored in the memory to perform the method provided by the above embodiments of the first aspect and/or any possible implementation in combination with the above embodiments of the first aspect.

In a fourth aspect, an embodiment of the present disclosure further provides a computer-readable storage medium, wherein a computer program is stored in the computer-readable storage medium, and the computer program, when run by a computer, performs the method provided by the above embodiments of the first aspect and/or any possible implementation in combination with the above embodiments of the first aspect.

BRIEF DESCRIPTION OF DRAWINGS

In order to illustrate the technical solutions of the embodiments of the present disclosure more clearly, the accompanying drawings that need to be used in the embodiments will be briefly introduced. It is to be understood that the accompanying drawings only show some embodiments of the present disclosure, so they shall not be regarded as limiting the scope. For those ordinarily skilled in the art, other relevant drawings may be obtained according to these drawings without creative efforts.

FIG. 1 is a flowchart of a first Bluetooth positioning method according to an embodiment of the present disclosure;

FIG. 2 is a flowchart of a second Bluetooth positioning method according to an embodiment of the present disclosure;

DETAILED DESCRIPTION OF EMBODIMENTS

Figures 3, 4:
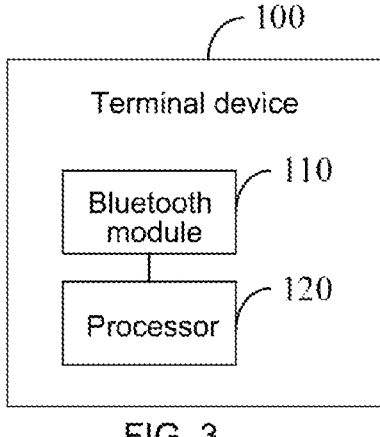
FIG. 3 is a structural block diagram of a terminal device according to an embodiment of the present disclosure.
FIG. 4 is a structural block diagram of an electronic device according to an embodiment of the present disclosure.

The terms "first", "second" and "third", etc. are only intended for distinguishing descriptions, rather than indicate sequence numbers, and cannot be understood as indicating or implying relative importance.

The technical solutions in the embodiments of the present disclosure will be described below with reference to the accompanying drawings of the embodiments of the present disclosure.

It should be noted that similar reference numerals and letters indicate similar items in the accompanying drawings, so once a certain item is defined in one drawing, it does not need to be further defined and described in subsequent drawings. Meanwhile, relational terms such as "first" and "second", etc. in the description of the present disclosure are only intended to distinguish one entity or operation from another entity or operation, and do not necessarily require or imply that there is any such actual relationship or order between these entities or operations. Moreover, the terms "comprise", "include", "contain" or any other variation thereof are intended to cover non-exclusive inclusion, so that a process, a method, an article or a device including a series of elements includes not only those elements, but also other elements not explicitly listed or elements inherent to such a process, a method, an article or a device. In the absence of further restrictions, an element defined by the statement "including one" does not exclude the existence of other same elements in the process, method, article or device including the element.

Furthermore, in the present disclosure, the term "and/or" only indicates a relation describing the related objects, which indicates that there may be three kinds of relations. For example, "A and/or B" may indicate that A exists alone, A and B exist at the same time, or B exists alone.

The technical solutions of the present disclosure will be described in detail with reference to the accompanying drawings.

Please refer to FIG. 1, which is a schematic flowchart of a Bluetooth positioning method according to an embodiment of the present disclosure, and the steps involved will be described with reference to FIG. 1.

S110: acquiring a sampled message, wherein the sampled message includes a sampled IQ data and a data signal strength indicator.

The sampled message may be pre-acquired and stored in a database, and may be called directly when needed, or the sampled message may be collected in real time when needed.

The sampled IQ data includes a plurality of sampled IQ values obtained by sequentially sampling signals received or transmitted by a plurality of antennas in the Bluetooth antenna array according to a preset order, and the signals received or transmitted by the plurality of antennas are signals transmitted by the identical signal source.

The preset order may be set according to actual needs, and the sampling order is not limited here.

In order to facilitate understanding the above sampled IQ data, the Bluetooth antenna array including antenna A, antenna B, and antenna C arranged in sequence is taken as an example to illustrate. If the preset order is antenna A, antenna B and antenna C, first sample antenna A is sampled to obtain a sampled IQ value a1, then antenna B is sampled to obtain a sampled IQ value b1, and then sample antenna C is sampled to obtain a sampled IQ value c1. Then antenna A is continued to be sampled to obtain a sampled IQ value a2, and so on, until the sampling time reaches a preset duration or the number of sampled IQ values reaches a preset number, so as to obtain the sampled IQ data including a1, b1, c1, a2, b2, c2, etc. The examples herein are provided for illustrative purpose only and should not be construed as a limitation on the present disclosure.

The above preset duration and preset quantity may be set according to actual needs, and their specific values are not limited here.

When the signals received or transmitted by the antenna is sampled, the strength of the signals received or transmitted by the antenna is determined to obtain a data signal strength indicator, and the data signal strength indicator is written into the sampled message.

In one implementation, after the sampled message is acquired, the phase differences corresponding to IQ values at different time points corresponding to the identical antenna may also be acquired based on the sampled IQ data, and then a phase compensation processing is performed on the phase differences between adjacent antennas based on the phase differences between IQ values at different time points corresponding to the identical antenna.

After the IQ value is acquired, the IQ value and its corresponding phase $\theta$ meets: $\tan \theta = I/Q$.

Specifically, after the phase differences between IQ values at different time points corresponding to the identical antenna is determined, the phase differences between adjacent antennas in the Bluetooth antenna array may be acquired based on the sampled IQ data to obtain a plurality of phase differences, and then the phase compensation processing may be performed on the plurality of phase differences obtained by using the phase differences between IQ values at different time points corresponding to the identical antenna. Accordingly, the specific implementation of obtaining the position angle based on the sampled IQ data sampled in the sampled message is: obtaining the position angle based on the plurality of phase differences after phase compensation processing.

For example, if the sampled IQ data includes a1, b1, c1, a2, b2 and c2, and antenna A, antenna B and antenna C are arranged in sequence, then based on the phase difference x0 between the two IQ values a1 and a2 at different time points corresponding to antenna A, the phase difference x1 may be determined based on a1 and b1, the phase difference x2 may be determined based on b1 and c1, the phase difference x3 may be determined based on a2 and b2, and the phase difference x4 may be determined based on b2 and c2. Then x0 is used to compensate the phase differences x1, x2, x3 and x4, respectively, so as to obtain the compensated phase differences x1', x2', x3' and x4' accordingly, and then the position angle is determined according to these four obtained compensated phase differences. The example herein is provided for illustrative purpose only and should not be construed as a limitation on the present disclosure.

In order to facilitate understanding, the sampled IQ data including a1, b1, c1, a2, b2 and c2 are taken as an example to illustrate. In the Bluetooth antenna array, antenna A, antenna B and antenna C are arranged in sequence, and IQ data a1 and a2 are obtained by sampling antenna A, IQ data b1 and b2 are obtained by sampling antenna B, and IQ data c1 and c2 are obtained by sampling antenna C. First, the corresponding phases of IQ data a1, b1, c1, a2, b2 and c2 are calculated to obtain $\theta_{a1}$, $\theta_{b1}$, $\theta_{c1}$, $\theta_{a2}$, $\theta_{b2}$ and $\theta_{c2}$. Then the phase differences between antenna A and antenna B, and the phase differences between antenna B and antenna C are calculated to obtain $\eta_{a1-b1}$, $\eta_{b1-c1}$, $\eta_{a2-b2}$ and $\eta_{b2-c2}$, and the phase difference $\eta_{a1-a2}$ between different time points of antenna A. Then the phase difference $\eta_{a1-a2}$ is used to compensate $\eta_{a1-b1}$, $\eta_{b1-c1}$, $\eta_{a2-b2}$ and $\eta_{b2-c2}$. That is, by subtracting the phase differences between different time points corresponding to the identical antenna from the phase differences between adjacent antennas, $\eta_{a1-b1}-\eta_{a1-a2}$, $\eta_{b1-c1}-\eta_{a1-a2}$, $\eta_{a2-b2}-\eta_{a1-a2}$ and $\eta_{b2-c2}-\eta_{a1-a2}$ are obtained. Accordingly, the position angle is finally calculated by using $\eta_{a1-b1}-\eta_{a1-a2}$, $\eta_{b1-c1}-\eta_{a1-a2}$, $\eta_{a2-b2}-\eta_{a1-a2}$ and $\eta_{b2-c2}-\eta_{a1-a2}$.

It can be understood that the phase differences between two IQ values at different time points corresponding to other antennas may also be determined, for example, the phase differences between two IQ values b1 and b2 corresponding to antenna B at different time points may also be determined. The specific selection of the antenna corresponding to the phase differences between two IQ values at different time points for phase compensation processing may be made according to actual needs, and is not limited here.

S120: judging whether the data signal strength indicator is greater than a preset threshold.

If the data signal strength indicator is greater than the preset threshold, the subsequent steps are continued to be performed; and if the data signal strength indicator is lower than the preset threshold, the sampled message is discarded.

The preset threshold may be set according to actual needs, and the specific value of the preset threshold is not limited here.

In one implementation, the number of the sampled messages whose data signal strength indicator is lower than a preset threshold may be acquired within a preset duration, and the preset threshold may be adjusted according to the number of sampled messages lower than the preset threshold.

Alternatively, the number of the sampled messages that is discarded in a certain duration may be counted, wherein when the number of the discarded messages is large in this duration, the value of the preset threshold may be reduced. On the contrary, when the number of discarded messages is small in this duration, the value of the preset threshold may be raised. The example is provided for illustrative purpose only herein and should not be construed as a limitation on the present disclosure.

For example, the preset threshold value is 10. If a total of N sampled messages are acquired within the 10 minutes, and there is one sampled message whose data signal strength indicator is smaller than the preset threshold value, then the preset threshold value may be increased, for example, to 12, and the data signal strength indicator in the subsequently received sampled message smaller than 12 is discarded. Here, N is greater than or equal to 100.

If a total of N sampled messages are acquired within the 10 minutes, and the data signal strength indicators in 15 of the N sampled messages are smaller than the preset threshold, then the preset threshold may be lowered, for example, to 8, and the data signal strength indicator in the subsequently received sampled messages smaller than 8 is discarded.

The examples are provided for illustrative purposes only and should not be construed as a limitation on the present disclosure.

S130: if the data signal strength indicator is greater than the preset threshold, a position angle of the signals is obtained based on the sampled IQ data in the sampled message.

It can be understood that when a plurality of antennas in the Bluetooth antenna array receives signals, the obtained position angle is the angle of arrival; when the plurality of antennas in the Bluetooth antenna array transmits signals, the obtained position angle is the angle of departure.

In one implementation mode, the specific process of obtaining the position angle based on the sampled IQ data in the sampled message may be as follows: first, acquiring, based on the sampled IQ data, phase differences between adjacent antennas in the Bluetooth antenna array, to obtain a plurality of phase differences; then, obtaining, based on the plurality of phase differences after the phase compensation processing, the position angle at a current time point. The implementation principle and implementation mode of determining the phase difference based on IQ value are described clearly in the foregoing, and will not be repeated here for brevity. The specific calculation process of obtaining based on the plurality of phase differences after the phase compensation processing the position angle at a current time point is well known to those skilled in the art, and will not be repeated here for brevity.

In another implementation mode, the specific process of obtaining the position angle based on the sampled IQ data in the sampled message may be as follows: first, acquiring, based on the sampled IQ data, phase differences between adjacent antennas in the Bluetooth antenna array, to obtain a plurality of phase differences; then, obtaining, based on the plurality of phase differences after the phase compensation processing, the position angle at a current time point. After that, determining the target position angle at the current time point based on the position angle and a plurality of position angles adjacent to the position angle.

The plurality of position angles adjacent to the position angle may be the position angles at a plurality of time points adjacent to the current time point calculated by this solution, the specific number of the plurality of time points adjacent to the current time point may be set according to actual needs, and is not limited here.

The specific implementation mode of determining the target position angle at the current time point based on the position angle and a plurality of position angles adjacent to the position angle may be: performing a weighted average processing on the position angle and the target position angles at a plurality of past time points to obtain the target position angle at the current time point.

In one implementation mode, when the signal source and the Bluetooth antenna array are relatively stationary or relatively moving, the target position angle at the current time point may be calculated in different ways.

When the signal source and the Bluetooth antenna array are relatively stationary, the determining the target position angle at the current time point based on the position angle and the target position angles at a plurality of time points adjacent to the current time point may be as follows: first, acquiring a first average value of the position angle and a plurality of position angles adjacent to the position angle; and then, removing, among the position angle and the plurality of position angles adjacent to the position angle, an angle whose difference with the first average value is greater than a preset angle threshold, and calculating a second average value of the remaining angles, wherein the second average value is the target position angle at the current time point.

The preset angle threshold here may be set according to actual needs, and its specific value is not limited here.

For example, when the preset angle threshold is 10° and the position angle is 65°, the target position angles at ten time points adjacent to the position angle are 56°, 48.5°, 69°, 74°, 82°, 65.4°, 53°, 61°, 76°, and 73.5°, respectively. The average value of the eleven angles is about 65.8°. Therefore, the angles smaller than 55.8° and greater than 75.8° are excluded, and there are seven remaining angles which are 65°, 56°, 69°, 74°, 65.4°, 61° and 73.5°, and the average value of the remaining angles is about 66.3°. Therefore, the target position angle at the current time point 66.3°. The example is provided for illustrative purpose only and should not be construed as a limitation on the present disclosure.

When the signal source and the Bluetooth antenna array are relatively moving, the determining the target position angle at the current time point based on the position angle and a plurality of position angles adjacent to the position angle may be: performing, based on preset weights, a weighted average processing on the position angle and the plurality of position angles adjacent to the position angle, to obtain the target position angle at the current time point. A weight value of a position angle corresponding to a time point closer to the current time point is greater, and a weight value of a position angle corresponding to a time point farther away from the current time point is smaller.

The sum of the preset weights is 1, or the average value of the preset weights is 1. When the sum of preset weights is 1, a weighted sum processing is performed on the position angle and the target position angles at a plurality of time points adjacent to the current time point. When the average value of the preset weights is 1, a weighted average processing is performed on the position angle and the target position angles at the plurality of time points adjacent to the current time point.

For example, if the preset weights are 0.8, 0.9, 1, 1.1 and 1.2 respectively from far to near, the position angle is 65°, and the four position angles adjacent to this position angle are 65.4°, 66.5°, 66° and 66.6° from near to far, then, the target position angle at the current time point is 65°*1.2+ 65.4°*1.1+66.5° *1+66° *0.9+66.6° *0.8=65.824°, so the target position angle at the current time point is 65.824°. The example is provided for illustrative purpose only and should not be construed as a limitation on the present disclosure.

In one implementation mode, before obtaining, based on the plurality of phase differences after the phase compensation processing, the position angle at a current time point, the method may further include determining that the standard deviation of the plurality of phase differences is smaller than a preset standard deviation threshold.

When the standard deviation of the plurality of phase differences is greater than or equal to the preset standard deviation threshold, a group of phase differences may be discarded, and a new sampled message may be acquired. Alternatively, the phase difference in the group of phase differences which has a larger deviation from the average value of the group of phase differences may be removed, and the standard deviation may be calculated again until the standard deviation is smaller than the preset standard deviation threshold. Then the position angle is calculated by using the remaining phase difference.

Alternatively, a group of phase differences that can be used for accurately calculating the position angle of the signal, and a group of phase differences that has a deviation from the actual position angle of the signal may be acquired in advance, and the standard deviations of the two groups of phase differences may be calculated respectively, and then the average of the two standard deviations is taken as the preset standard deviation threshold.

For example, when a plurality of phase differences are phase differences x1, x2, x3 and x4 respectively, the standard deviation of the phase differences x1, x2, x3 and x4 may be calculated first, and when the standard deviation is smaller than the preset standard deviation threshold, the position angle may be determined by using the four phase differences.

When the standard deviation is greater than or equal to the preset standard deviation threshold, the phase differences x1, x2, x3 and x4 may be discarded, a new sampled message may be acquired, and the phase difference may be calculated again.

Alternatively, it is possible to remove a phase difference in the four phase differences x1, x2, x3 and x4 that has a larger deviation from the average value of the four phase differences, and then calculate the standard deviation again. If the average value of the four phase differences is x5, and the difference between the phase difference x1 and the average value is 0.1, the difference between the phase difference x2 and the average value is −0.05, the difference between the phase difference x3 and the average value is 0.15, and the difference between the phase difference x4 and the average value is −0.2, then the phase difference x4 is removed, and then the second standard deviation of the phase differences x1, x2 and x3 are calculated. If the second standard deviation is smaller than a preset standard deviation threshold, the position angle is calculated by using the phase differences x1, x2 and x3. The example is provided for illustrative purpose only and should not be construed as a limitation on the present disclosure.

To further understand the above Bluetooth positioning method, please refer to FIG. 2. It should be noted that the principle shown in FIG. 2 is one of various embodiments of the Bluetooth positioning method provided by the present disclosure, so the mode shown in FIG. 2 cannot be understood as a limitation on the present disclosure.

As shown in FIG. 2, a sampled message is first acquired, and then it is judged whether the data signal strength indicator in the sampled message is greater than a preset strength threshold.

If the data signal strength indicator in the sampled message is greater than the preset strength threshold, the phase differences corresponding to IQ values at different time points corresponding to the identical antenna are acquired based on the sampled IQ data included in the sampled message.

Then, based on the phase differences between IQ values at different time points corresponding to the identical antenna, a phase compensation processing is performed. Then, based on the sampled IQ data after phase compensation, the phase differences between adjacent antennas in the Bluetooth antenna array are acquired to obtain a plurality of phase differences.

Then it is judged whether the standard deviation of the plurality of phase differences is smaller than the preset standard deviation threshold, if the standard deviation of the plurality of phase differences is greater than or equal to the preset standard deviation threshold, the phase difference with the largest deviation from the average value of the phase differences among the plurality of phase differences is removed, and the standard deviation of the remaining phase differences is calculated until the calculated standard deviation is smaller than the preset standard deviation threshold. Then the position angle at the current time point is obtained based on the remaining phase difference, and a plurality of position angles adjacent to the position angle are acquired. Finally, the target position angle is determined based on the position angle and the plurality of position angles adjacent to the position angle.

The specific implementation principle and implementation mode of steps S210 to S300 shown in FIG. 2 have been clearly described in the foregoing, and will not be repeated here for brevity.

In order to facilitate understanding, the position angle being the angle of arrival is taken as an example to illustrate. First, the signals received by a plurality of antennas in the Bluetooth antenna array are sequentially sampled to obtain a plurality of sampled IQ values, and the signal strength received by the Bluetooth antenna array is acquired. Then, based on the sampled IQ values and the signal strength, the sampled message is generated. After that, the sampled message is processed according to the steps shown in FIG. 2, and the angle of arrival may be obtained.

Taking the position angle being the angle of departure as an example, first, the signals transmitted by the plurality of antennas in the Bluetooth antenna array are sequentially sampled to obtain the plurality of sampled IQ values, and the signal strength transmitted by the Bluetooth antenna array is acquired. Then, based on the sampled IQ values and the signal strength, the sampled message is generated. After that, the sampled message is processed according to the steps shown in FIG. 2, and the angle of departure may be obtained.

Please refer to FIG. 3, which is a structural block diagram of a terminal device according to an embodiment of the present disclosure. The terminal device 100 includes a Bluetooth module 110 and a processor 120.

The Bluetooth module 110 includes a Bluetooth antenna array and a Bluetooth chip. The Bluetooth chip is configured to sequentially sample signals received or transmitted by a plurality of antennas in the Bluetooth antenna array according to a preset order to obtain a plurality of sampled IQ values, acquire a data signal strength indicator of the signals received or transmitted by the Bluetooth antenna array, and generate a sampled message based on the plurality of sampled IQ values and the data signal strength indicator.

The processor 120 is configured for: acquiring the sampled message transmitted by the Bluetooth module, and judging whether the data signal strength indicator carried in the sampled message is greater than a preset threshold, wherein if the data signal strength indicator is greater than the preset threshold, a position angle of the signals received or transmitted by the Bluetooth antenna array is obtained based on the sampled IQ data in the sampled message.

The processor 120 is specifically configured for: acquiring, based on the sampled IQ data, phase differences between adjacent antennas in the Bluetooth antenna array, to obtain a plurality of phase differences; acquiring, based on the sampled IQ data, phase differences corresponding to IQ values at different time points corresponding to an identical antenna; performing, based on the phase differences between the IQ values at different time points corresponding to the identical antenna, a phase compensation processing on the plurality of phase differences; and obtaining, based on the plurality of phase differences after the phase compensation processing, the position angle at a current time point.

The processor 120 is further configured for, before the obtaining based on the plurality of phase differences after the phase compensation processing the position angle at a current time point, determining that a standard deviation of the plurality of phase differences is smaller than a preset standard deviation threshold.

The processor 120 is further configured for, after obtaining the position angle at a current time point, determining a target position angle based on the position angle and a plurality of position angles adjacent to the position angle.

The processor 120 is specifically configured for, when the signal source and the Bluetooth antenna array are relatively stationary, acquiring a first average value of the position angle and a plurality of position angles adjacent to the position angle; and removing, among the position angle and the plurality of position angles adjacent to the position angle, an angle whose difference with the first average value is greater than a preset angle threshold, and calculating a second average value of the remaining angles, wherein the second average value is the target position angle at the current time point.

The processor 120 is specifically configured for, when the signal source and the Bluetooth antenna array are relatively moving, performing, based on preset weights, a weighted average processing on the position angle and the plurality of position angles adjacent to the position angle, to obtain the target position angle at the current time point, wherein a weight value of a position angle corresponding to a time point closer to the current time point is greater, and a weight value of a position angle corresponding to a time point farther away from the current time point is smaller.

The processor 120 is further configured for acquiring the number of sampled messages whose data signal strength indicator is lower than the preset threshold within a preset duration; and adjusting the preset threshold according to the number of sampled messages lower than the preset threshold.

The implementation principle and technical effects of the terminal device 100 provided by the embodiment of the present disclosure are the same as those of the embodiments of the aforementioned Bluetooth positioning method. For brevity, please refer to the corresponding contents of the embodiments of the aforementioned Bluetooth positioning method for the parts not mentioned in the device embodiment.

Please refer to FIG. 4, which shows an electronic device 200 provided by an embodiment of the present disclosure. The electronic device 200 includes a transceiver 210, a memory 220, a communication bus 230 and a processor 240.

The elements of the transceiver 210, the memory 220 and the processor 240 are directly or indirectly electrically connected to each other to implement data transmission or interaction. For example, these elements may be electrically connected to each other through one or more communication buses 230 or signal lines. The transceiver 210 is configured for transmitting and receiving data. The memory 220 is configured for storing a computer program. The processor 240 is configured for acquiring a sampled message, wherein the sampled message includes sampled IQ data and a data signal strength indicator, the sampled IQ data includes a plurality of sampled IQ values obtained by sequentially sampling signals received or transmitted by a plurality of antennas in a Bluetooth antenna array according to a preset order, and the signals received or transmitted by the plurality of antennas are signals transmitted by an identical signal source; and judging whether the data signal strength indicator is greater than a preset threshold, wherein if the data signal strength indicator is greater than the preset threshold, a position angle of the signals is obtained based on the sampled IQ data in the sampled message.

The memory 220 may be, but is not limited to, a random access memory (RAM), a read only memory (ROM), a programmable read-only memory (PROM), an erasable programmable read-only memory (EPROM), an electrically erasable programmable read-only memory (EEPROM), etc.

The processor 240 may be an integrated circuit chip with signal processing capability. The above processor may be a general processor, including a central processing unit (CPU), a network processor (NP), etc., and may also be a digital signal processor (DSP), an application specific integrated circuit (ASIC), a field programmable gate array (FPGA) or other programmable logic devices, discrete gate or transistor logic devices, and discrete hardware components that can implement the methods, steps and logic blocks disclosed in the embodiments of the present disclosure. The general processor may be a microprocessor or the processor 240 may be any conventional processor, etc.

The above electronic device 200 includes, but is not limited to, a personal computer, a server, etc.

An embodiment of the present disclosure further provides a nonvolatile computer-readable storage medium (hereinafter referred to as the storage medium), in which a computer program is stored, and the computer program, when run by a computer such as the electronic device 200, perform the Bluetooth positioning method described above. The computer-readable storage medium may be a U disk, a mobile hard disk, a read-only memory (ROM), a random access memory (RAM), a magnetic disk or an optical disk, and other media that can store program codes.

The above are only the preferred embodiments of the present disclosure, and are not intended to limit the present disclosure. For a person skilled in the art, various modifications and changes may be made to the present disclosure. Any modification, equivalent replacement, improvement, etc. made within the spirit and principles of the present disclosure shall fall within the scope of protection of the present disclosure.

What is claimed is:

1. A Bluetooth positioning method, comprising steps of:

acquiring a sampled message, wherein the sampled message comprises a sampled IQ data and a data signal strength indicator, and the sampled IQ data comprises a plurality of sampled IQ values obtained by sequentially sampling, according to a preset order, signals received or transmitted by a plurality of antennas in a Bluetooth antenna array, wherein the signals received or transmitted by the plurality of antennas are signals transmitted by an identical signal source; and judging whether the data signal strength indicator is greater than a preset threshold, wherein when the data signal strength indicator is greater than the preset threshold, a position angle of the signals is obtained based on the sampled IQ data in the sampled message;

the step of a position angle of the signals is obtained based on the sampled IQ data in the sampled message comprises steps of:

acquiring, based on the sampled IQ data, phase differences between adjacent antennas in the Bluetooth antenna array, to obtain a plurality of phase differences;

acquiring based on the sampled IQ data, phase differences corresponding to IQ values at different time points corresponding to an identical antenna;

performing, based on the phase differences between the IQ values at different time points corresponding to the identical antenna, a phase compensation processing on the plurality of phase differences; and obtaining, based on the plurality of phase differences after the phase compensation processing, the position angle at a current time point.

2. The method according to claim 1, wherein the method further comprises, before the step of obtaining based on the plurality of phase differences after the phase compensation processing the position angle at a current time point, a step of:

determining that a standard deviation of the plurality of phase differences is smaller than a preset standard deviation threshold.

3. The method according to claim 2, further comprising:

acquiring number of the sampled messages whose data signal strength indicator is lower than the preset threshold within a preset duration; and adjusting the preset threshold according to the number of the sampled messages whose data signal strength indicator is lower than the preset threshold.

4. The method according to claim 1, wherein the method further comprises, after the step of obtaining the position angle at a current time point, a step of:

determining a target position angle based on the position angle and a plurality of position angles adjacent to the position angle.

5. The method according to claim 4, wherein when the signal source and the Bluetooth antenna array are relatively stationary, the step of determining a target position angle based on the position angle and a plurality of position angles adjacent to the position angle comprises:

acquiring a first average value of the position angle and a plurality of position angles adjacent to the position angle; and removing, among the position angle and the plurality of position angles adjacent to the position angle, an angle whose difference from the first average value is greater than a preset angle threshold, and calculating a second average value of the remaining angles, wherein the second average value is the target position angle at the current time point.

6. The method according to claim 5, further comprising:

acquiring number of the sampled messages whose data signal strength indicator is lower than the preset threshold within a preset duration; and adjusting the preset threshold according to the number of the sampled messages whose data signal strength indicator is lower than the preset threshold.

7. The method according to claim 4, wherein when the signal source and the Bluetooth antenna array are relatively moving, the step of determining a target position angle based on the position angle and a plurality of position angles adjacent to the position angle comprises:

performing, based on preset weights, a weighted average processing on the position angle and the plurality of position angles adjacent to the position angle, to obtain the target position angle at the current time point, wherein a weight value of a position angle corresponding to a time point closer to the current time point is greater, and a weight value of a position angle corresponding to a time point farther away from the current time point is smaller.

8. The method according to claim 7, further comprising:

acquiring number of the sampled messages whose data signal strength indicator is lower than the preset threshold within a preset duration; and adjusting the preset threshold according to the number of the sampled messages whose data signal strength indicator is lower than the preset threshold.

9. The method according to claim 4, further comprising:

acquiring number of the sampled messages whose data signal strength indicator is lower than the preset threshold within a preset duration; and adjusting the preset threshold according to the number of the sampled messages whose data signal strength indicator is lower than the preset threshold.

10. The method according to claim 1, further comprising:

acquiring number of the sampled messages whose data signal strength indicator is lower than the preset threshold within a preset duration; and adjusting the preset threshold according to the number of the sampled messages whose data signal strength indicator is lower than the preset threshold.

11. An electronic device, comprising a memory and a processor, wherein non-transitory computer-readable instructions are stored in the memory, and the non-transitory computer-readable instructions, when executed by the processor, cause the processor to perform the method according to claim 1.

12. The electronic device according to claim 11, wherein the step of a position angle of the signals is obtained based on the sampled IQ data in the sampled message comprises steps of:

acquiring, based on the sampled IQ data, phase differences between adjacent antennas in the Bluetooth antenna array, to obtain a plurality of phase differences;

acquiring, based on the sampled IQ data, phase differences corresponding to IQ values at different time points corresponding to an identical antenna;

performing, based on the phase differences between the IQ values at different time points corresponding to the identical antenna, a phase compensation processing on the plurality of phase differences; and obtaining, based on the plurality of phase differences after the phase compensation processing, the position angle at a current time point.

13. The electronic device according to claim 11, wherein the method further comprises, before the step of obtaining based on the plurality of phase differences after the phase compensation processing the position angle at a current time point, a step of:

determining that a standard deviation of the plurality of phase differences is smaller than a preset standard deviation threshold.

14. The electronic device according to claim 11, wherein the method further comprises, after the step of obtaining the position angle at a current time point, a step of:

determining a target position angle based on the position angle and a plurality of position angles adjacent to the position angle.

15. The electronic device according to claim 11, wherein when the signal source and the Bluetooth antenna array are relatively stationary, the step of determining a target position angle based on the position angle and a plurality of position angles adjacent to the position angle comprises:

acquiring a first average value of the position angle and a plurality of position angles adjacent to the position angle; and removing, among the position angle and the plurality of position angles adjacent to the position angle, an angle whose difference from the first average value is greater than a preset angle threshold, and calculating a second average value of the remaining angles, wherein the second average value is the target position angle at the current time point.

16. The electronic device according to claim 11, wherein when the signal source and the Bluetooth antenna array are relatively moving, the step of determining a target position angle based on the position angle and a plurality of position angles adjacent to the position angle comprises:

performing, based on preset weights, a weighted average processing on the position angle and the plurality of position angles adjacent to the position angle, to obtain the target position angle at the current time point, wherein a weight value of a position angle corresponding to a time point closer to the current time point is greater, and a weight value of a position angle corresponding to a time point farther away from the current time point is smaller.

17. The electronic device according to claim 11, further comprising:

acquiring number of the sampled messages whose data signal strength indicator is lower than the preset threshold within a preset duration; and adjusting the preset threshold according to the number of the sampled messages whose data signal strength indicator is lower than the preset threshold.

18. The method according to claim 1, further comprising:

acquiring number of the sampled messages whose data signal strength indicator is lower than the preset threshold within a preset duration; and adjusting the preset threshold according to the number of the sampled messages whose data signal strength indicator is lower than the preset threshold.

* * * * *